April 11, 1950     L. D. SWEETMAN     2,503,567
LARIAT
Filed Sept. 10, 1946

INVENTOR.
Lauren D. Sweetman
BY
Harry P. Schroeder

Patented Apr. 11, 1950

2,503,567

UNITED STATES PATENT OFFICE 2,503,567

LARIAT

Laurence D. Sweetman, Oakland, Calif.

Application September 10, 1946, Serial No. 695,919

1 Claim. (Cl. 46—1)

This invention relates to a child's toy; the object being to provide what may be termed a miniature lariat, so arranged that the child, upon swinging the device may obtain generally the same results as are obtained by a cowboy manipulating his rope to lasso an animal or when performing tricks with the rope as an entertainment feature.

Referring to the numerals of reference on the drawings, the rope 1, of a length suitable for the use of children is formed at one end with an eye 2, through which the other end of the rope slidably passes as shown.

Figure 1:
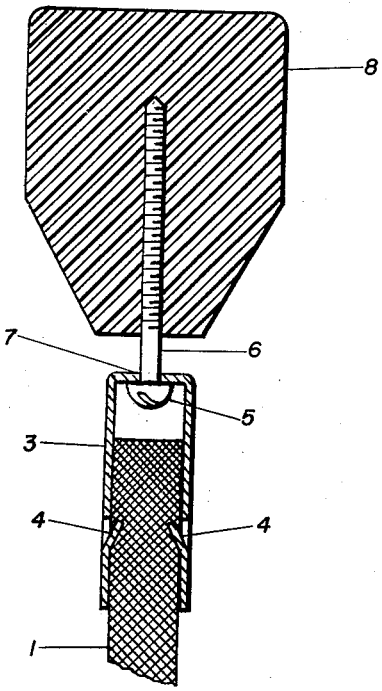
Figure 1 is a fragmentary sectional elevation showing the handle and the means for connecting the same to the rope.

At said other end, the rope passes into a metal socket 3, which is formed with punched-out prongs 4, adapted to be pressed into the rope as shown in Figure 1.

The rope terminates short of the top of the socket so as to leave room for a screw head 5. The threaded stem 6, of the screw projects freely through a hole 7, in the top of the socket and engages threads in a grip or handle 8, preferably of a suitable plastic.

Figure 2:
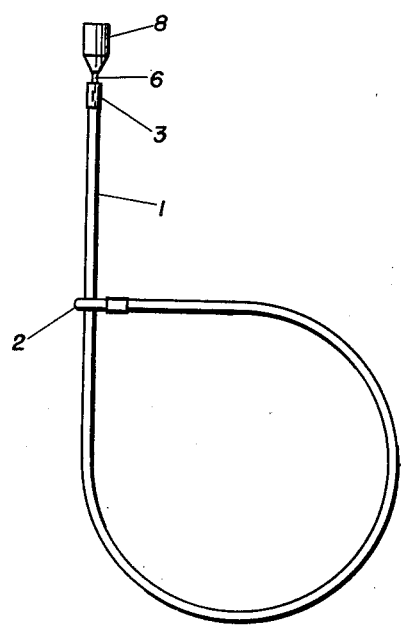
Figure 2 is an elevational view of the toy.
Figure 3:
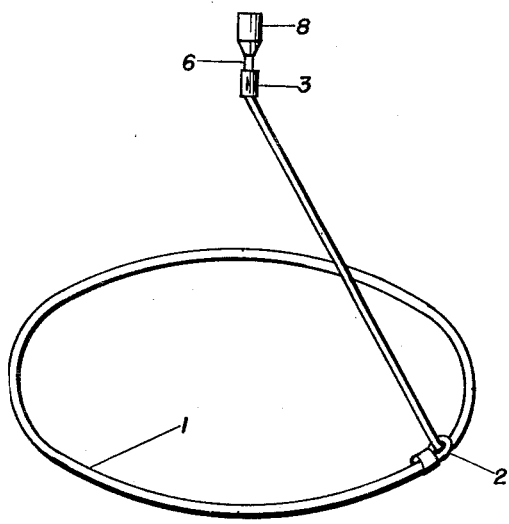
Figure 3 is a perspective view of the same in use.

The toy operates as follows:

The child grasps the handle 8, and swings it in, say, a 6 inch circle. Centrifugal force causes the rope 1, to assume the form of a circle in about the position shown in Figure 3, and in this position it remains until rotation of handle 1, ceases. The rope 1, then assumes the position shown in Figure 2, due to its inherent resiliency.

The swivel or universal connections between the handle and rope enables the handle to be held rigid and the rope to twirl about said connection as an axis, without twisting the rope.

I claim:

A child's toy comprising a length of rope having an eye on one end through which the other end of the rope is adapted to slide, a handle, a swivel connection between said other end of the rope and said handle, said connection including a cylindrical socket in which the latter mentioned end of the rope is confined, a plurality of prongs punched out of the body of said socket inwardly at an angle pointing toward said end of the rope, said socket being closed with a top having a hole in the middle thereof, a screw passing through said hole and having its head inside of said socket, said screw being screwed into the handle.

LAURENCE D. SWEETMAN.

REFERENCES CITED

The following references are of record in the file of this patent:

UNITED STATES PATENTS

| Number | Name | Date |
|---|---|---|
| 1,651,057 | Goldstein | Nov. 29, 1927 |
| 2,181,979 | Schaeffer | Dec. 5, 1939 |
| 2,253,075 | Johnson | Aug. 19, 1941 |

FOREIGN PATENTS

| Number | Country | Date |
|---|---|---|
| 8,807 | Great Britain | June 10, 1884 |